(12) United States Patent
Obrecht et al.

(10) Patent No.: US 8,251,657 B2
(45) Date of Patent: Aug. 28, 2012

(54) LOAD MITIGATION DEVICE FOR WIND TURBINE BLADES

(75) Inventors: John M. Obrecht, Louisville, CO (US); Kevin J. Standish, Erie, CO (US); Paul F. Medina, Boulder, CO (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/985,589

(22) Filed: Jan. 6, 2011

(65) Prior Publication Data

US 2012/0063896 A1 Mar. 15, 2012

(51) Int. Cl.
*B64C 9/00* (2006.01)

(52) U.S. Cl. ............. 416/23; 416/42; 416/44; 416/90 R; 416/231 R

(58) Field of Classification Search .................... 416/41, 416/42, 44, 90 R, 169 R, 23, 231 R
See application file for complete search history.

(56) References Cited

U.S. PATENT DOCUMENTS

| | | | | |
|---|---|---|---|---|
| RE29,317 E | * | 7/1977 | Mosley et al. | ............... 73/866.4 |
| 6,719,020 B1 | * | 4/2004 | Bisotto | ........................ 141/313 |
| 6,802,303 B2 | * | 10/2004 | Håkansson | ................... 123/574 |
| 7,765,747 B1 | | 8/2010 | Smalley, III | |
| 2007/0193135 A1 | | 8/2007 | VandenBerg | |
| 2008/0116321 A1 | | 5/2008 | Tuinder | |
| 2009/0028718 A1 | | 1/2009 | Enevoldsen et al. | |
| 2009/0092490 A1 | | 4/2009 | Brooks | |

* cited by examiner

*Primary Examiner* — Edward Look
*Assistant Examiner* — Adam W Brown

(57) ABSTRACT

The present invention includes a rotor blade (20) having a blade body (30) with a leading edge (26) and a trailing edge (28) and opposed first and second surfaces (34, 36) extending there between defining an airfoil shape (32) in cross-section. A passageway (42) extends through the blade body (30) between the first and second surfaces (34, 36). A flexible member (60) is sealed over one end (50) of the passageway (42). Advantageously, the flexible member (60) is passively responsive to changes in a differential pressure between the first and second surfaces (34, 36) to move between a deactivated position (62) and an activated position (64) where the flexible member (60) extends away from the airfoil shape (32) to function as a load mitigation device (40) for the wind turbine rotor blade (20).

18 Claims, 6 Drawing Sheets

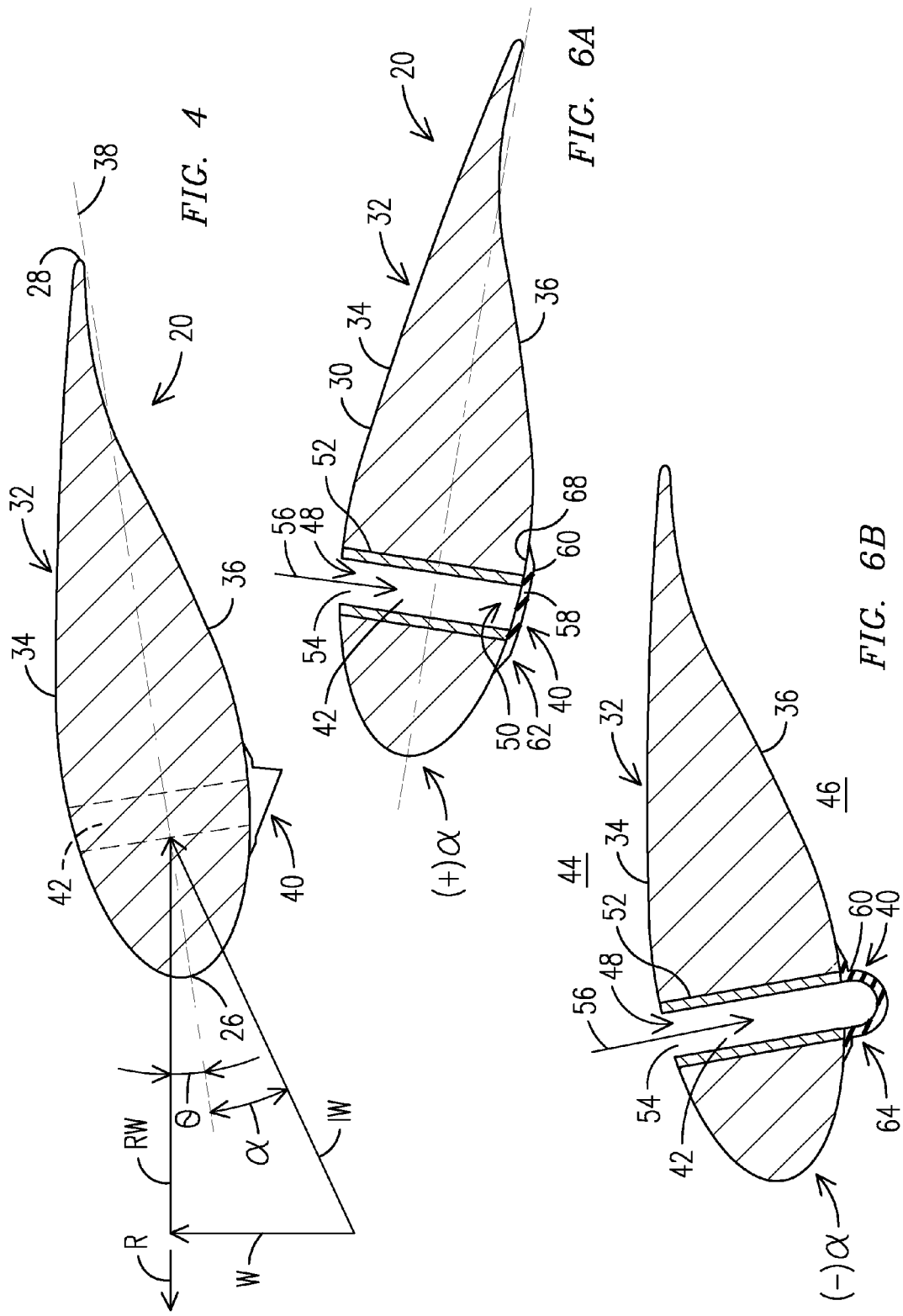

LOAD MITIGATION DEVICE FOR WIND TURBINE BLADES

FIELD OF THE INVENTION

The present invention relates to wind turbines, and more particularly to a load mitigation device for use in wind turbines.

BACKGROUND OF THE INVENTION

Typically, wind turbines include a rotor having a plurality of rotor blades mounted thereon; a drive train and a generator housed in a nacelle; and a tower. The nacelle and the rotor are typically mounted on top of the tower. The blades each include an upwind side and a downwind side. In optimal operation, a pocket of low-pressure air forms on the downwind side of the blade. The low-pressure air pocket pulls the blade toward it, causing the rotor to turn. This is referred to as "lift." The force of the lift is actually much stronger than the wind's frictional force opposing motion, which is called "drag." Lift will always be at a right angle to the wind while drag will follow in the direction of the wind. The combination of lift and drag causes the rotor to spin the blades of the rotor. Both lift and drag may change abruptly when the angle of attack for the wind turbine changes. The angle of attack of the wind impinging on the rotor blade is the angle between the rotor blade's reference line (e.g., the chord line of the airfoil shape) and the oncoming air flow. In operation, wind turbines occasionally receive wind gusts and other extreme wind scenarios in which the angle of attack turns negative. In this case, the lift generated by the wind turbine blade is highly detrimental to the performance and lifetime of the blade and can cause serious damage.

BRIEF DESCRIPTION OF THE DRAWINGS

The invention is explained in the following description in view of the drawings that show:

FIG. 4 depicts dimensions used to characterize the rotor blade 20 and the wind conditions about the rotor blade.

FIGS. 6A-6B show a load mitigation device disposed on a rotor blade in the deactivated position and the activated position in accordance with an aspect of the present invention.

DETAILED DESCRIPTION OF THE INVENTION

The present inventors have innovatively developed a load mitigation device for use with wind turbine blades and a wind turbine blade incorporating the device. When activated, the load mitigation device will lower the detrimental forces generated by a wind turbine blade. For example, when the angle of attack of wind impinging upon a wind turbine blade is negative, the pressure difference between opposed surfaces of the wind turbine blade activates a load mitigation device that will change shape to lower the lift generated by the blade while increasing the generated drag. Typically, the loss of lift is significantly larger than the gain in drag. The mitigation in loads on the wind turbine blade can lead to an increased lifetime of the existing blades and of newly manufactured blades.

Figure 1:
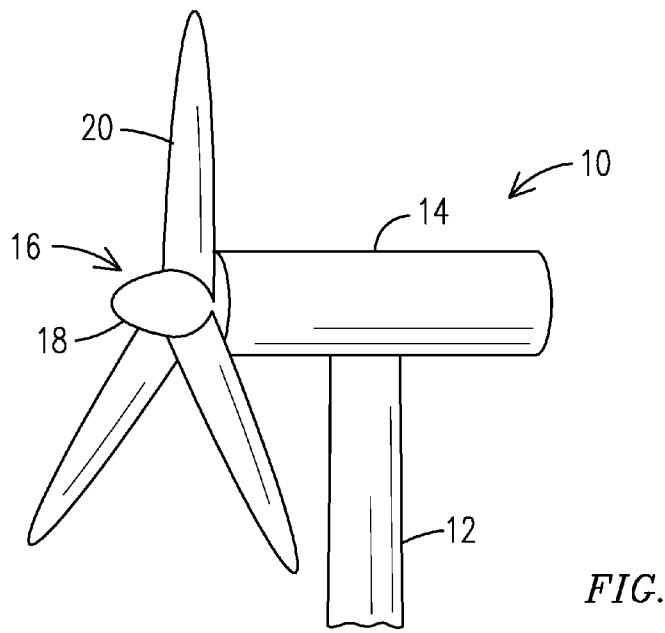
FIG. 1 illustrates a wind turbine having three rotor blades in accordance with an aspect of the present invention.
Figure 2:
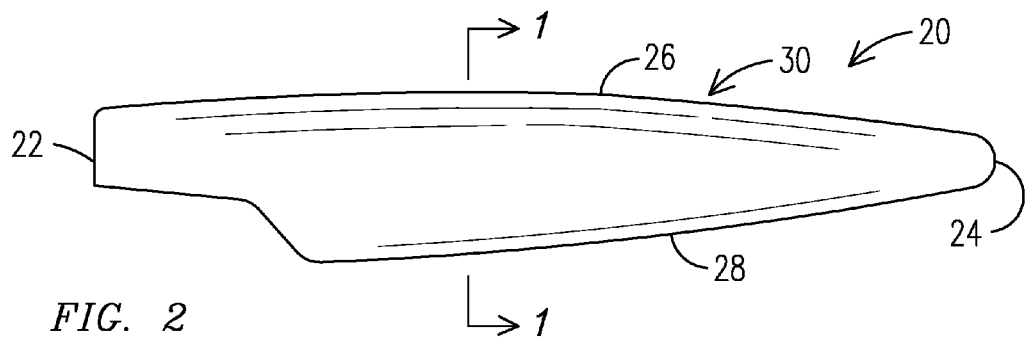
FIG. 2 is a side view of a rotor blade from the wind turbine of FIG. 1 in accordance with an aspect of the present invention.

Now referring to the figures, FIG. 1 illustrates a wind turbine 10 having a tower 12, a nacelle 14 mounted on the tower 12, and a rotor 16 having a hub 18 and a plurality of rotor blades 20 thereon. FIG. 2 shows an exemplary rotor blade 20 having a root region 22, typically having a cylindrical profile, and a tip region 24 that defines the outermost part of the blade 20. The rotor blade 20 further includes a leading edge 26 and a trailing edge 28. A shell body 30 extends between the leading edge 26 and the trailing edge 28 and forms an airfoil shape in cross-section there between.

Figure 3:
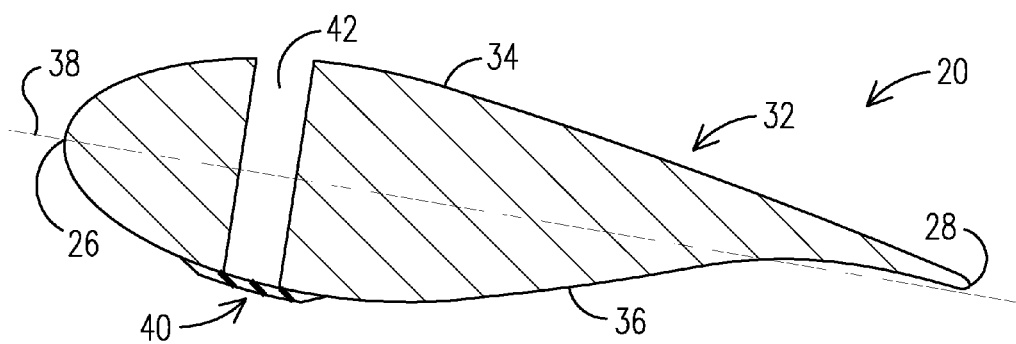
FIG. 3 is a sectional view of the rotor blade of FIG. 2 taken along line 1-1 (airfoil shape in cross section) in accordance with an aspect of the present invention.

FIG. 3 shows the airfoil shape in cross-section 32 (taken at line 1-1 of FIG. 2) in detail as comprising a first surface 34 and a second surface 36. The first surface 34 and the second surface 36 are disposed between the leading edge 26 and the trailing edge 28 and define the airfoil shape 32 in cross-section (hereinafter airfoil shape 32 or airfoil cross-section 32). During normal and optimal operation, the first surface 34 may be referred to as the suction surface of the blade 20 and the second surface 36 may be referred to as the pressure surface of the blade 20. The dashed-dotted line extending from the leading edge 26 of the rotor blade 20 to its trailing edge 28 represents the chord line 38 of the rotor blade 20. As shown in FIG. 3, the exemplary rotor blade 20 includes a load mitigation device 40 disposed at the end of a passageway 42 that extends between the first surface 34 and the second surface 36 of the rotor blade 20 as will be described in further detail below.

FIG. 4 shows further dimensions used to characterize the rotor blade 20 and the wind conditions about the rotor blade 20. As shown in FIG. 4, arrow (W) represents the wind direction of the ambient wind while arrow (R) represents the rotation direction of the rotor blade 20. The chord line 38 of the rotor blade 20 and the rotation direction include an angle θ, which is typically referred to as the twist angle of the rotor blade 20. The twist angle is set such that a rotor comprising one or more rotor blades, e.g., rotor blade 20, rotates with the optimum rotor speed and such that the power of the associated wind turbine is limited to a maximum power output. Due to the rotation of the rotor blade 20, the rotor blade 20 is impinged by a relative wind as indicated by arrow (RW). The relative wind (RW) and the ambient wind (W) sum up vectorially to an incident wind, represented by (IW). The angle between the chord line 38 and the direction of the incident wind (IW) is called the angle of attack, which impinges upon the rotor blade 20 and is shown as (α).

Figure 5A:
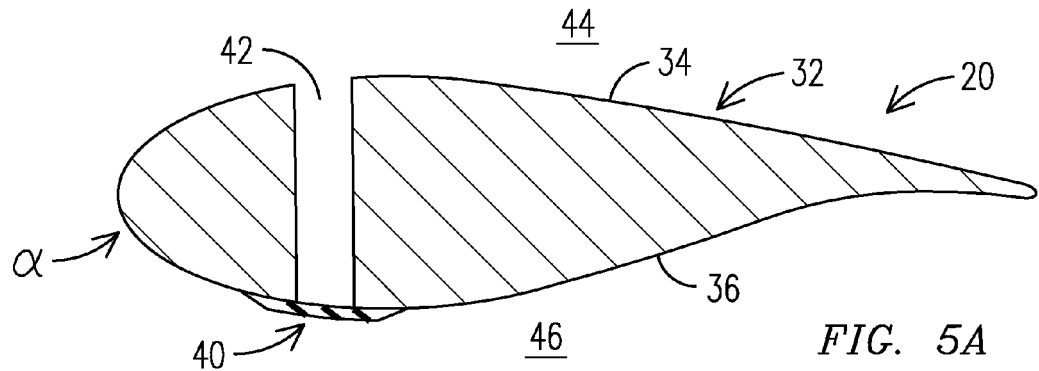
FIGS. 5A-5C show a position of the airfoil shape in cross-section when the rotor blade is impinged by wind having different angles of attack.
Figure 5B:
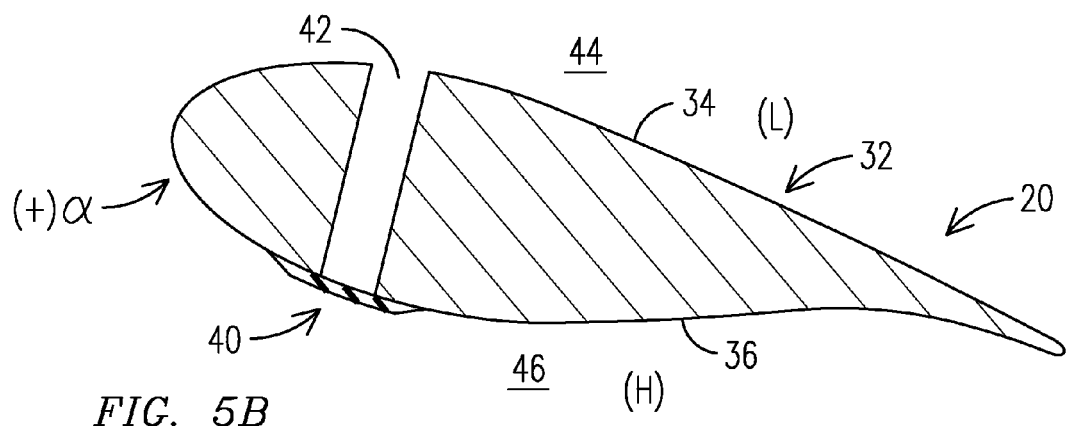
Figure 5C:
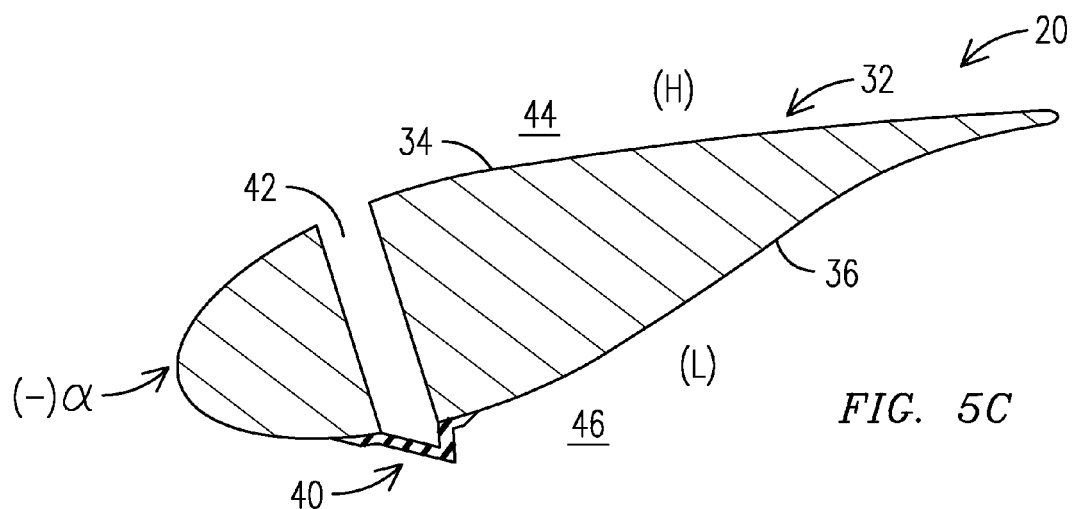

FIGS. 5A-5C show simplified illustrations of the positions of an exemplary rotor blade 20 of the present invention upon being impinged by wind at various angles of attack (neutral, positive, and negative respectively). As shown in FIG. 5A, the rotor blade 20 (airfoil shape 32 thereof) is shown having an angle of attack (α) equal to zero (or substantially close to zero). As such, a static pressure of a first region 44 of air about the first surface 34 is substantially equal to a static pressure of a second region 46 of the second surface 36. As shown in FIG. 5B, in optimal wind conditions, the rotor blade 20 has a positive angle of attack (+) α. With a positive angle of attack (+) α, the first region 44 about the first surface 34 has a lower static pressure (L) than the second region 46 of air (H) about the second surface 36. Typically, the low pressure air pocket (first region 44) pulls the blade 20 toward it, thereby causing the rotor 16 to turn. As shown in FIG. 5C, the rotor blade 20 is shown as having a negative angle of attack (−) α. With a negative angle of attack, the first region 44 about the first surface 34 instead has a higher static pressure (H) than the second region 46 of air (L) about the second surface 36. When this occurs, the rotor blade 20 may experience undesirable high lift forces, which oppose traditional, power-producing motion and which may potentially damage the rotor blade 20.

Advantageously, the present invention includes a load mitigation device that is configured to move from a first deactivated position to a second activated position to sacrifice lift for more drag when the rotor blade 20 is subjected to wind having a negative angle of attack (−α). Referring to FIG. 6A, there is depicted a rotor blade, e.g., rotor blade 20, having an embodiment of the load mitigation device 40 in accordance with an aspect of the present invention. The rotor blade includes a passageway 42 that extends between the first surface 34 and the second surface 36 of the shell body 30. The passageway 42 also includes a first end 48 and a second end 50. It is understood that FIG. 6A shows the passageway 42 for purposes of clarity only and that FIG. 6A is not necessarily drawn to scale. The passageway 42 may be any suitable width for allowing the entry of air therein, which will activate the load mitigation device 40. In certain embodiments, the passageway 42 may have a width of from 1-1000 mm, for example.

Any suitable structure may be provided for defining the passageway 42 between the first surface 34 and the second surface 36. In one embodiment, a tube 52 may be provided as shown between the first surface 34 and the second surface 36 to define the passageway 42 in the rotor blade 20. The tube may be formed from any suitable relatively rigid material, such as a metallic alloy or a polymeric material. The passageway 42 may be formed in an existing or new rotor blade, for example, by drilling opposed holes into the rotor blade on opposed sides thereof, inserting the tube 52 there between, and securing the tube 52 as needed utilizing fasteners, adhesives, or the like.

A first opening 54 is disposed at the first surface 34 and at the first end 48 of the passageway 42 for allowing the entry of air 56 into the passageway 42. The load mitigation device 40 is disposed over the second end 50 of the passageway 42. In the embodiment shown, the load mitigation device 40 comprises a body 58 having a flexible member 60 that is sealed over the second end 50 of the passageway 42. Critically, the flexible member 60 substantially prevents the entry of the air 56 or the exit of the air 56 from the passageway 42. Further, due to the seal formed by the flexible member 60 over the second end 50 of the passageway 42, the flexible member 60 may be passively responsive to changes in a differential pressure between regions of air at the first surface 34 and at the second surface 36 of the rotor blade 20.

When, for example, the first region 44 about the first surface 34 has a higher static pressure (H) than the second region 46 about the second surface 36 in the presence of a negative angle of attack impinging on the rotor blade 20 (as shown in FIG. 5C), air 56 will flow into the passageway 42 creating an air pressure force sufficient to move the flexible member 60 from a deactivated position 62 to an activated position 64. In the deactivated position 62 as shown in FIG. 6A, the flexible member 60 is configured to generally conform to the airfoil shape 32 in cross-section. Thus, in the deactivated position 62, the load mitigation device 40 comprising the flexible member 60 optimally will not substantially change the flow dynamics over the rotor blade 20. As shown in FIG. 6B, in the activated position 64, the flexible member 60 is configured to extend away from the airfoil shape 32, e.g., the second surface 36, to significantly alter flow dynamics and function as the load mitigation device 40 for the rotor blade 20.

The shape or profile of the flexible member 60 is not limited to any particular structure. It is understood that it is mainly critical that when the rotor blade 20 experiences a negative angle of attack, the flexible member 60 is able to be expanded or extended into an activated position, e.g., activated position 64, and will have a profile or shape that will be effective to sacrifice a degree of lift for a greater amount of drag to mitigate loads on the rotor blade 20. Advantageously, the resulting geometry of the load mitigation device 40 in the activated position 64 will induce flow separation immediately aft of the device for negative angle of attack while no discernible effect is seen for positive angle of attacks where the load mitigation device conforms to a shape of a surface of the rotor blade 20, e.g. the airfoil shape 32.

It is also critical that the flexible member 60 be in sealed relationship with a surface of the shell body 30 of the rotor blade 20 in both the deactivated position 62 and the activated position 64. Any suitable structure may be utilized to seal the load mitigation device 40 comprising the flexible member 60 over the second end 50 of the passageway 42. Suitable structures include one or more of an adhesive, e.g., adhesive 68 as shown, suitable fasteners, e.g., nuts and bolts, and the like. By forming a seal on one end of the passageway 42, e.g., second end 50, the air 56 entering the passageway 42 is unable to enter or escape from the passageway 42 at the sealed end. In the case of a negative angle of attack, a sufficient air pressure force will build up in the passageway 42 (similar to a bladder) to cause the flexible member 60 to deform, e.g., expand, and be activated.

The flexible member 60 may be formed from a material having one or more of a degree of strength, a degree of flexibility, and a thickness such that the flexible member 60 will not tear or shear under the forces expected to be experienced by the rotor blade 20 and the flexible member 60. For example, the flexible member 60 should not tear or shear under the air pressure force acting upon the flexible member 60 as described herein. Suitable flexible materials for use with the load mitigation device 40 include natural and synthetic rubbers, such as isoprene rubber, epichlorohydrin rubber, urethane rubber, silicone rubber, acrylic rubber, acrylonitrol-butadiene-styrene rubber and the like, and blends thereof. Alternatively, the flexible member 60 may be any suitable polymeric material, such as one or more elastomer materials. In any case, the flexible member 60 will deform under the desired wind conditions so as to extend from a surface of the shell body 30, for example, when the rotor blade 20 is impinged by wind having a negative angle of attack. Thereafter, the flexible member 60 may substantially return to its deactivated position in the absence of a negative angle of attack. It is understood that different materials will return to the deactivated position 62 from the activated position 64 at different rates and with differing deformation factors, which may result in the flexible member 60 not completely returning to its original position.

Figure 7A:
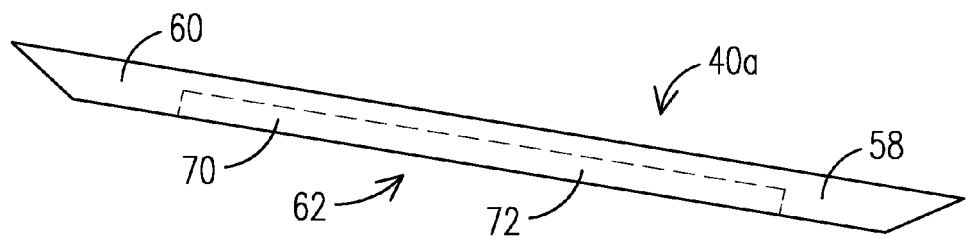
FIGS. 7A-7B show a load mitigation device having a rigid plate in accordance with another aspect of the present invention.
Figure 7B:
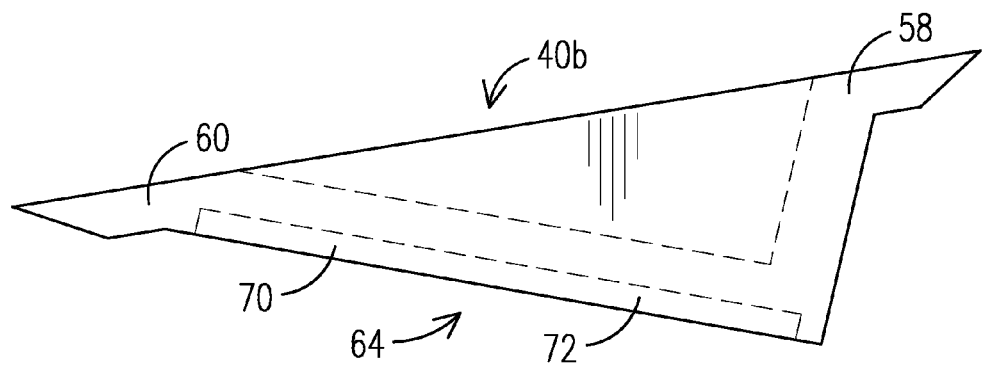

In another aspect of the present invention, the shape of the load mitigation device 40 in the deactivated position 62 and the activated position 64 may be controlled by incorporating a rigid portion 70 into the load mitigation device 40. The rigid portion 70 will also aid in maintaining a relatively constant shape for the load mitigation device 40 in the deactivated position 62 and the activated position 64. In one embodiment, as shown in FIG. 7A, there is a load mitigation device 40*a* comprising the flexible member 60 and the rigid portion 70 is in the form of a rigid plate 72. The load mitigation device 40 is sized so as to span across the second end 50 of the passageway 42 in the deactivated position 62 (similar to the load mitigation device 40 shown in FIG. 6). The flexible member 60 may be located at any position on the blade 20 that will allow at least a portion of the rigid plate 72 to extend from the shell body 30 of the rotor blade 20 to which the load mitigation device 40 is attached. Typically, the rigid plate 72 is in communication with the flexible member 60. In one embodiment, the rigid plate 72 may be embedded within the flexible member 60 as shown in FIG. 7A. In this embodiment, the presence of an air pressure force in the passageway 42 will cause the rigid plate 72 to expand or move outward into the activated position 64 shown in FIG. 7B.

Figure 9:
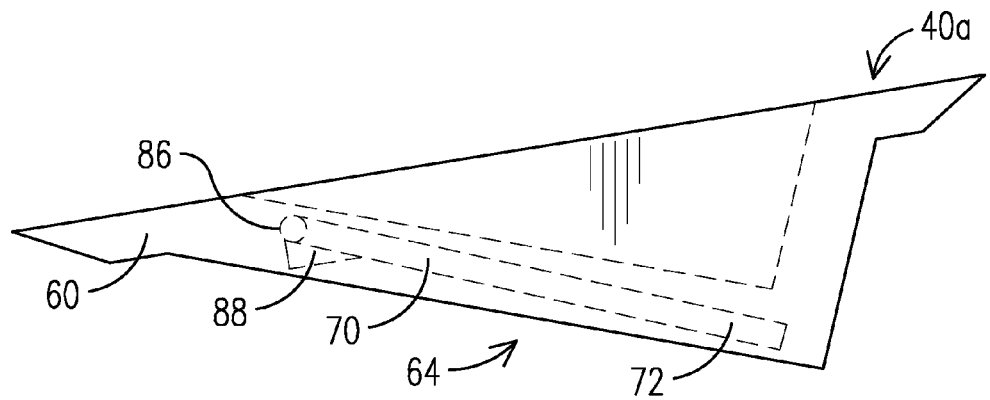
FIG. 9 shows a load mitigation device having a hinge and a hinge stop in accordance with another aspect of the present invention.
Figure 8A:
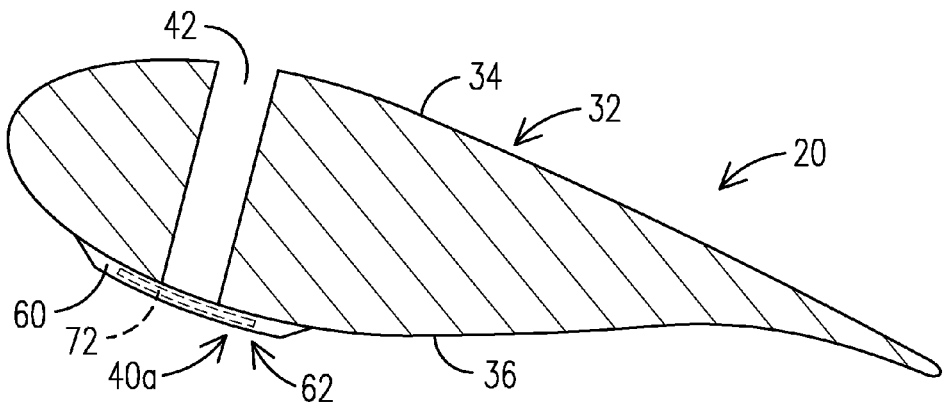
FIGS. 8A-8B show a load mitigation device disposed on a rotor blade both in the deactivated position and the activated position in accordance with another aspect of the present invention.
Figure 8B:
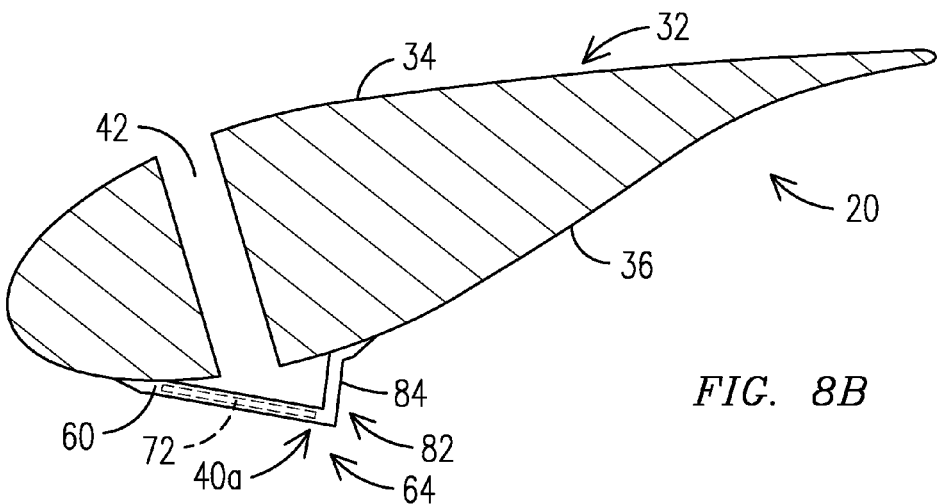

Referring now to FIG. 8A, when the load mitigation device 40*a* is disposed on a rotor blade 20 as described herein, the rigid plate 72 may extend over the passageway 42 in the deactivated position 62 as shown in FIG. 8A. In this way, in response to a sufficient air pressure force in the passageway 42, the flexible member 60 and the rigid plate 72 will extend away from the shell body 30 at an angle to define a substantially wedge-shaped member 82 as shown in FIG. 8B. As shown, there will also be an extended region 84 of the flexible member 60, which aids in maintaining a seal at the second surface 36 of the rotor blade 20. The air pressure force in the passageway 42 is typically sufficient to maintain the load mitigation device 40*a* in the activated position 64 so long as the rotor blade 20 is subjected to a negative angle of attack. Optionally, as shown in FIG. 9, any embodiment of the load mitigation device described herein, e.g., load mitigation device 40*a*, may further include a hinge 86 in connection with the rigid plate 72 to allow movement of the rigid plate 72 about the hinge 86. In this embodiment, the load mitigation device 40*a* may also include a stop 88 for the hinge 86 to limit the angle at which the flexible member 60 and the rigid plate 72 will deploy in the activated position 70.

Figure 10:
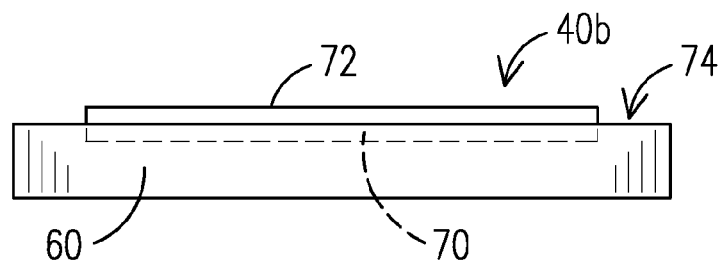
FIG. 10 shows a load mitigation device in accordance with another aspect of the present invention.

The present invention is not limited to any particular construction of the load mitigation device. It is desired that the load mitigation device minimally interferes with the flow dynamics under neutral or positive angle of attack conditions and deform to sacrifice an amount of lift for an amount of drag under negative angle of attack conditions. In another embodiment, as shown in FIG. 10, the load mitigation device 40*b* may comprise a rigid plate 72 that is disposed on a side of the flexible member 60, such as on a top portion 74 of the flexible member 60 as shown. The rigid plate 72 may lie relatively flush with a plane of the flexible member 60 or alternatively, the rigid plate 72 may extend above a plane of the flexible member 60 as shown.

Figure 11A:
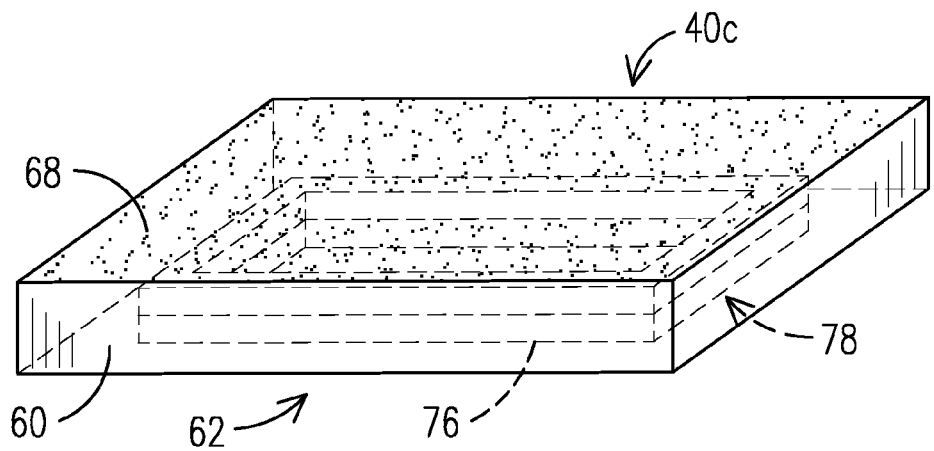
FIGS. 11A-11B show a load mitigation device in the deactivated position and the activated position in accordance with an aspect of the present invention.
Figure 11B:
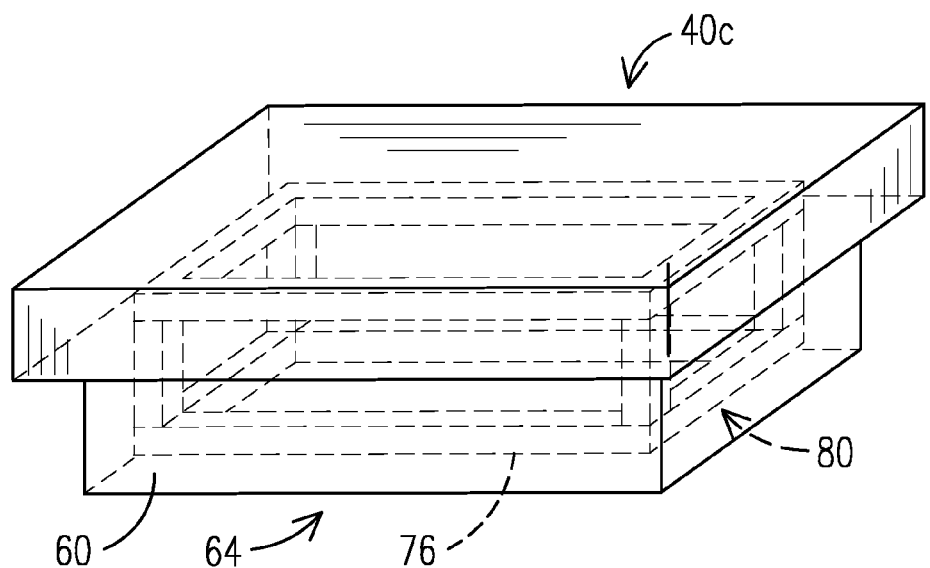

In yet another embodiment, as shown in FIG. 11A, the load mitigation device 40*c* may comprise the flexible member 60 and a rigid portion 72 in the form of a rigid frame 76 that is embedded within the flexible member 60 as shown. In the deactivated position 62, the rigid frame 76 may comprise a folded frame that is configured to move from a folded position 78 as shown in FIG. 11A to an expanded position 80 as shown in FIG. 11B. In the embodiment, upon a sufficient air pressure force in the passageway 42 of the rotor blade 20 to which the load mitigation device 40*c* is affixed, the air pressure acting upon at least a portion of the load mitigation device 40*c* will cause the rigid frame 76 to move into an expanded position 80. In the expanded position 80, the rigid frame 76 also expands the body of the flexible member 60 such that the load mitigation device 40*c* is in the activated position 64. As shown in FIG. 11A, as in any of the devices described herein, the load mitigation device 40*c* may include an adhesive 68 for attaching the load mitigation device 40*c* to a rotor blade 20.

Figure 12:
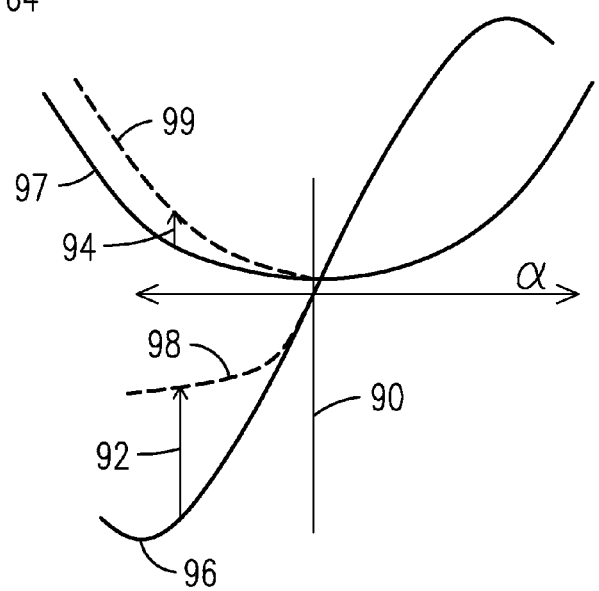
FIG. 12 is a graph showing a lift-drag curve for a load mitigation device in accordance with another aspect of the present invention.

To illustrate the effect of the embodiments of the load mitigation devices described herein, a lift-drag curve is shown in FIG. 12 for the embodiment described in FIGS. 8A-8B. It is noted that a similar or identical curve would be expected for other embodiments of the load mitigation device as described herein. In the graph of FIG. 12, it is shown that for negative angles of attack (defined by the region left of the y-axis 90), an amount of lift 92 may be sacrificed for an amount of drag 94. The amount of lift 92 is shown graphically as the distance between the solid line 96 and the dashed line 98. Similarly, the amount of drag 94 brought about by the load mitigation device, e.g., load mitigation device 40*a*, is shown as the distance between the solid line 97 and the dashed line 99. As is also shown, there is no substantial change in lift or drag for positive angles of attack (defined by the region to the right of the y-axis 90).

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine rotor blade, comprising:
  a blade body comprising a leading edge and a trailing edge with opposed first and second surfaces extending there between defining an airfoil shape in cross-section;
  a passageway through the blade body between the first and second surfaces; and
  a flexible member sealed over one end of the passageway, the flexible member passively responsive to changes in a differential pressure between regions of air at the first and second surfaces to move between a deactivated position where the flexible member generally conforms to the airfoil shape and an activated position where the flexible member extends away from the airfoil shape to function as a load mitigation device for the wind turbine rotor blade.

2. The wind turbine rotor blade of claim 1, wherein the flexible member further comprises a rigid portion in communication therewith.

3. The wind turbine rotor blade of claim 2, wherein the rigid portion comprises a rigid frame.

4. The wind turbine rotor blade of claim 2, wherein the rigid portion comprises a rigid plate.

5. The wind turbine rotor blade of claim 2, wherein an entire portion of the rigid portion is configured to extend from the airfoil shape in the presence of an air pressure force in the passageway.

6. The wind turbine rotor blade of claim 2, wherein the flexible seal further comprises a hinge operably connected to the rigid portion at an upstream end of the flexible member for allowing the rigid portion to extend at an angle from the airfoil shape.

7. The wind turbine rotor blade of claim 6, wherein the hinge comprises a stop member for limiting a maximum angle at which the rigid portion may extend from the airfoil shape.

8. The wind turbine rotor blade of claim 4, wherein the rigid plate is disposed across the one end of the passageway in the deactivated position.

9. The wind turbine rotor blade of claim 1, wherein the flexible member comprises a rubber material.

10. The wind turbine rotor blade of claim 1, wherein the passageway is defined by a tube extending between the first and second surfaces.

11. The wind turbine rotor blade of claim 1, wherein the flexible member comprises an adhesive at a bottom portion thereof for attaching the flexible member to the blade body.

12. A load mitigation device for attachment to a rotor blade of a wind turbine having an airfoil profile defined between first and second surfaces, the load mitigation device comprising:
    a flexible member having a rigid member in communication with a body of the flexible member;
    wherein the flexible member is configured to extend from a first deactivated position to a second activated position in the presence of an air pressure force on at least a portion of the flexible member; and
    wherein the flexible member comprises an adhesive at a bottom portion thereof for attaching the flexible member to the rotor blade.

13. The load mitigation device of claim 12, wherein the rigid member comprises a rigid frame.

14. The load mitigation device of claim 12, wherein the rigid member comprises a rigid plate.

15. The load mitigation device of claim 12, wherein the rigid member is embedded within the flexible member.

16. The load mitigation device of claim 12, wherein the flexible member and the rigid member are configured to extend laterally in response to an air pressure force acting on at least a portion of the load mitigation device.

17. The load mitigation device of claim 12, wherein the load mitigation device further comprises a hinge operably connected to the rigid member at an upstream end of the flexible member for allowing movement of the rigid member about the hinge.

18. The load mitigation device of claim 12, wherein the flexible member comprises a rubber material.

* * * * *